United States Patent
Zhang et al.

(10) Patent No.: US 10,261,841 B2
(45) Date of Patent: Apr. 16, 2019

(54) SYSTEM AND METHOD FOR TASK SCHEDULING AND DEVICE MANAGEMENT

(71) Applicant: BEIJING DIDI INFINITY TECHNOLOGY AND DEVELOPMENT CO., LTD., Beijing (CN)

(72) Inventors: Haifeng Zhang, Beijing (CN); Likang Tian, Beijing (CN); Qiang Ren, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/980,684

(22) Filed: May 15, 2018

(65) Prior Publication Data
US 2018/0314565 A1 Nov. 1, 2018

Related U.S. Application Data

(63) Continuation of application No. PCT/CN2017/082377, filed on Apr. 28, 2017.

(51) Int. Cl.
*G06F 9/46* (2006.01)
*G06F 9/50* (2006.01)
*G06F 9/48* (2006.01)

(52) U.S. Cl.
CPC .......... *G06F 9/5083* (2013.01); *G06F 9/4881* (2013.01)

(58) Field of Classification Search
CPC .............................. G06F 9/5083; G06F 9/4881
See application file for complete search history.

(56) References Cited

U.S. PATENT DOCUMENTS

2018/0113791 A1* 4/2018 Fink .................... G06F 11/3664

FOREIGN PATENT DOCUMENTS

| CN | 102811136 A | 12/2012 |
| CN | 103197976 A | 7/2013 |
| CN | 104077212 A | 10/2014 |

(Continued)

OTHER PUBLICATIONS

International Search Report in PCT/CN2017/082377 dated Jan. 24, 2018, 4 pages.

(Continued)

*Primary Examiner* — Wissam Rashid
(74) *Attorney, Agent, or Firm* — Metis IP LLC

(57) ABSTRACT

Systems and methods are provided for task scheduling and device management. Such system may comprise (1) a server comprising a client module, a master module, a first node, a second node, and a third node, and (2) one or more worker devices each coupled to the server and one or more computing devices. The worker devices may be configured to obtain device information of the computing devices, register the computing devices under the first node, and indicate statuses of the computing devices to the server. The client module may be configured to obtain task data associated with a task and register the task under the second node. The master module may be configured to assign under the third node the task to one or more of the registered computing devices based at least on the obtained device information, the obtained task data, and the computing device statuses.

18 Claims, 8 Drawing Sheets

(56) References Cited

FOREIGN PATENT DOCUMENTS

| | | |
|---|---|---|
| CN | 104363300 A | 2/2015 |
| CN | 105279017 A | 1/2016 |
| WO | 2012151855 A1 | 11/2012 |

OTHER PUBLICATIONS

Written Opinion of the International Searching Authority in PCT/CN2017/082377 dated Jan. 24, 2018, 4 pages.

\* cited by examiner

SYSTEM AND METHOD FOR TASK SCHEDULING AND DEVICE MANAGEMENT

CROSS REFERENCE

This application is a continuation of International Application No. PCT/CN2017/082377 filed on Apr. 28, 2017, the entire contents of which are hereby incorporated by reference.

TECHNICAL FIELD

This disclosure generally relates to approaches and techniques for scheduling, controlling, and monitoring testing devices.

BACKGROUND

In software development, applications need to test-run on various devices before being used as a final product. Many challenges are present for creating a clear and effective testing platform.

SUMMARY

Various embodiments of the present disclosure can include systems, methods, and non-transitory computer readable media configured to perform task scheduling and device management. A computing system for task scheduling and device management may comprise (1) a server comprising a client module, a master module, a first node, a second node, and a third node, and (2) one or more worker devices each coupled to the server and one or more computing devices. The one or more worker devices may be configured to obtain device information of the one or more computing devices, register the one or more computing devices under the first node, and indicate statuses of the one or more computing devices to the server. The client module may be configured to obtain task data associated with a task and register the task under the second node. The master module may be configured to assign under the third node the task to one or more of the registered computing devices based at least on the obtained device information, the obtained task data, and the computing device statuses.

In some embodiments, the task may comprise at least one of a feature test task, a compatibility test task, a performance test task, or a Monkey test task.

In some embodiments, the one or more computing devices may comprise a plurality of mobile devices of different operation environments, and the operation environments may comprise at least one of operation systems, device brands, or device models.

In some embodiments, the task data may comprise type of the task, information of one or more computing devices to run the task, an account assignment requirement associated with the task, information of an APP (application) to be tested, and an address of a test script for running the task.

In some embodiments, the information of the APP address may comprise a URL (Uniform Resource Locator), and the script address comprises a git address.

In some embodiments, assigning under the third node the task to one or more of the registered computing devices based at least on the obtained device information, the obtained task data, and the computing device statuses, the master module may determine one or more of the registered computing devices based at least on the obtained device information, the obtained task data, and the computing device statuses, and assign under the third node the task to the one or more determined computing devices.

In some embodiments, the first node may be coupled to one or more first sub-nodes each for representing one of the computing devices and for storing the device information, the device status, and task performance result from the corresponding computing device, the second node may be coupled to one or more second sub-nodes, each second sub-node for storing a task, and the third node may be coupled to one or more third sub-nodes, each third sub-node for representing an assignment of the task to one of the computing devices.

In some embodiments, the server may be further accessible to a fourth node coupled to one or more fourth sub-nodes, each fourth sub-node for representing a test account. Assigning under the third node the task to one or more of the registered computing devices based at least on the obtained device information, the obtained task data, and the computing device statuses may comprise: monitoring the first node; in response to detecting one or more idle first sub-nodes, setting the one or more first sub-nodes as busy; monitoring the fourth node; in response to detecting one or more available fourth sub-nodes, setting the fourth sub-nodes to busy and associating the fourth sub-nodes with the one or more first sub-nodes; establishing mapping between the one or more first sub-nodes and a test script for running the task; and removing the new second sub-node and creating the one or more third sub-nodes to assign the task to the one or more first sub-nodes, the one or more third sub-nodes comprising data of the association of the fourth sub-nodes and of the established mapping.

In some embodiments, the server may be further accessible to a fifth node coupled to one or more fifth sub-nodes, each fifth sub-node for representing a status. The master module may be further configured to create a fifth sub-node under the fifth node, and in response to finding no idle first sub-node, no available fourth sub-node, or the mapping unsuccessful, set the fifth sub-node to error.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTIONS OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
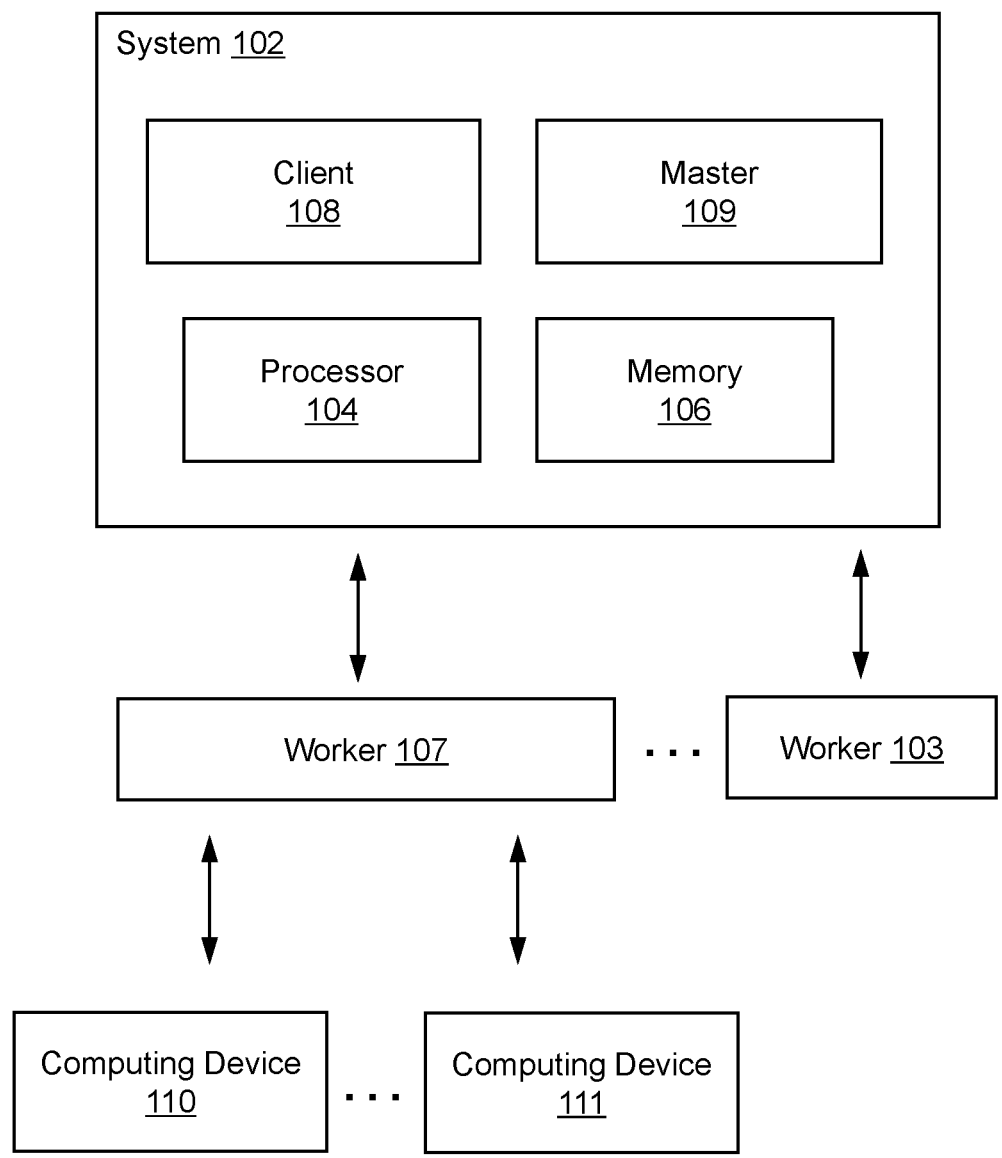
FIG. 1 illustrates an example environment for task scheduling and device management, in accordance with various embodiments.

Applications often have to be tested on different devices (e.g., computers, mobile phones, wearable devices, etc.) to ensure their reliability and expected performance. The operation environments and configurations of the various devices may affect the implementations of the application. By the tests, user-end performances of the applications can be monitored, providing bases for improvement, debugging, and error catching. In current technologies, significant resources have to be committed for constructing a such testing platform. Most of existing test systems, such as a cellphone wall, are complicated and inefficient.

Various embodiments described below can overcome the problems arising in the realm of application testing. In various implementations, a computing system for task scheduling and device management may comprise a server coupled to one or more computing devices. The server may be accessible to a first, second, third, fourth, and fifth nodes. The first node may be coupled to one or more first sub-nodes each representing one of the computing devices. The second node may be coupled to one or more second sub-nodes each representing a test task. The third node may be coupled to one or more third sub-nodes each representing an assignment of the test task to the computing device. The fourth node may be coupled to one or more fourth sub-nodes each representing a test account. The fifth node may be coupled to one or more fifth sub-nodes each representing a status. The server may comprise a "client," a "master," and a "worker," each of which may be a system, a device, a module, a program, or a combination thereof. The client, master, and worker may be incorporated in the server or disposed outside the server. The client, master, and worker that are disposed outside of the server can be coupled to the server through wired or wireless connections, and can be considered as "comprised" by the server in this application. The client, master, and worker may access the various nodes and/or sub-nodes to effectuate task scheduling and device management through the server. The data nodes and sub-nodes may be data points in a data system. The nodes and sub-nodes may be a part of: a software (e.g., a folder in a folder system, a logic (e.g., a pointer) that selectively points to corresponding data, etc.), a hardware (e.g., a computer in a computer network, a storage space, a non transitory computer-readable memory, etc.), or a combination thereof (e.g., a storage point or space in the memory 106) in the system. Each node may comprise one or more sub-nodes, and each sub-node may comprise one or more sub-nodes.

The term "couple" means directly or indirectly link, connect, join, associate, have access to, be accessible to, or point to. For example, a node may be a file folder, and a sub-node may be a sub-file folder. Each node and sub-node may have an address, at which data can be stored, forming a hierarchy data structure. For another example, a node or sub-node may be a pointer (e.g., a pointer in a tree data structure) that points to a specific storage space (e.g., a memory address, a hard drive address, etc.). The node, sub-nodes, and data associated with or written under the node or sub-node may be stored in main memory, ROM, and/or storage described below with reference to FIG. 5. The node, sub-node, and data associated with or written under the node or sub-node may be stored in a hard disc to prevent loss of information.

In some embodiments, the client may receive or generate new tasks. The master may assign the new tasks to the computing devices. The worker may communicate with and control the computing devices to perform various steps. The computing devices may comprise a plurality of mobile devices of different operation environments, and the operation environments may comprise at least one of operation systems, device brands, or device models.

In some embodiments, the server may comprise one or more processors and a memory storing instructions that, when executed by the one or more processors, cause the system to perform task scheduling and device management. The system may be configured to obtain task data associated with a new test task, create a new second sub-node associated with the new test task under the second node, the new second sub-node comprising the task data, and create one or more third sub-nodes to assign the new test task to one or more of the computing devices under the first node based on the obtained task data. The new test task may comprise at least one of a feature test task, a compatibility test task, a performance test task, or a Monkey test task.

In some embodiments, creating the one or more third sub-nodes to assign the new test task to the one or more computing devices under the first node based on the obtained task data may comprise: monitoring the first node; in response to detecting one or more idle first sub-nodes, setting the one or more first sub-nodes as busy; monitoring the fourth node; in response to detecting one or more available fourth sub-nodes, setting the fourth sub-nodes to busy and associating the fourth sub-nodes with the one or more first sub-nodes; establishing mapping between the one or more first sub-nodes and a test script for running the new test task; and removing the new second sub-node and creating the one or more third sub-nodes to assign the new test task to the one or more first sub-nodes, the one or more third sub-nodes comprising data of the association of the fourth sub-nodes and of the established mapping. The server may be further configured to create a fifth sub-node under the fifth node, and in response to finding no idle first sub-node, no available fourth sub-node, or the mapping unsuccessful, set the fifth sub-node to error.

As such, the task scheduling and device management can be effectively implemented through the server. For example, the client can submit new test tasks, the master can assign the tasks to various computing devices, and the worker can control the computing devices to perform the new test tasks. Such platform can be scaled with test tasks and computing devices to provide effective quality control and monitoring of application testing.

FIG. 1 illustrates an example environment 100 for task scheduling and device management, in accordance with various embodiments. As shown in FIG. 1, the example environment 100 can comprise at least one computing system 102 (e.g., a server, a computer, etc.) that includes a client 108, a master 109, one or more processors 104, and memory 106. The memory 106 may be non-transitory and computer-readable. The memory 106 may store instructions that, when executed by the one or more processors 104, cause the one or more processors 104 to perform various operations described herein. The environment 100 may further include one or more worker devices (e.g., worker 107, worker 103, etc.) and one or more computing devices (e.g., a computing device 110 and a computing device 111) that are accessible to the system 102.

In some embodiments, the system 102, the worker 107, the worker 103, the client 108, and the master 109 may operate as physically separated devices. For example, the worker 107, the worker 103, the client 108, and the master 109 may be mobile devices or computers, and the system 102 may be a server. Alternatively, two or more of the system 102, the worker 107, the worker 103, the client 108, and the master 109 may be integrated in a single device or system, such as the integration of the system 102, the client 108, and the master 109 as shown in FIG. 1. For example, the client 108 and the master 109 may be a module or program of the system 102. A module may refer to logic embodied in hardware or firmware, or to a collection of software instructions, possibly having entry and exit points, written in a programming language. A software module may be compiled and linked into an executable program, installed in a dynamic link library, or may be written in an interpreted programming language. The modules or computing device functionalities described herein are preferably implemented as software modules, but may be represented in hardware or firmware. Software modules configured for execution on computing devices may be provided on a computer readable medium, such as a compact disc, digital video disc, flash drive, magnetic disc, or any other tangible medium, or as a digital download. Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Though shown as an independent device in FIG. 1, the worker 107 and the worker 103 may be modules integrated with the system 102 in some alternative embodiments.

The worker 107, client 108, and master 109 may be anywhere accessible to the system 102, for example, in the memory 106, in a device (e.g., network storage device) coupled to the system 102, or another storage location (e.g., cloud-based storage system, network file system, etc.), etc. In general, the system 102, the worker 107, the client 108, the master 109, the computing device 110, and/or the computing device 111 may be able to communicate externally or internally with one another through one or more wired or wireless networks (e.g., the Internet) through which data can be communicated. Any step or method performed by the worker, master, and client as described herein may be performed by the system 102, for example, when they are integrated in one system or device.

The one or more computing devices may include cellphones, tablets, computers, etc. The computing devices may include a computing device 110 and a computing device 111. The computing devices may comprise a plurality of mobile devices (e.g., mobile phones) of different operation environments, and the operation environments may comprise operation systems, device brands, or device models. Therefore, the computing devices may comprise cellphones of various brands, models, operation systems, etc.

In some embodiments, a software (e.g., a program, an APP (application), etc.) can be scheduled to test-run on the computing devices, and the test-run can be performed according to various test tasks (e.g., tasks to demonstrate the performance, improve the functionality, catch errors and bugs, etc.). The test tasks may be comprised in one or more test scripts. The APP and test script may be anywhere accessible to the system 102, for example, in the memory 106, in a device (e.g., network storage device) coupled to the system 102, or another storage location (e.g., cloud-based storage system, network file system, etc.), etc.

In some embodiments, the client 108 and the master 109 may be modules of the system 102, and the system 102 may be implemented as a server. The client 108 may be configured to input and output to the server (e.g., receive new tasks, output task assignments to computing devices, etc.). The master 109 may be configured to assign the new task to one or more computing devices (e.g., by creating nodes or sub-nodes and assigning tasks therein under the system 102). Further, the worker devices such as the worker 107 may be implemented as a computer, a computer hub, a local server, a USB hub, etc. Each of the worker devices may be coupled to one or more computing devices. The worker 107 may couple to the computing devices via various connections such as USB connections. This configuration between the server and the worker devices is advantageous for scaling the number of computing devices to perform various tasks. Since each worker device connected to the server can bring connections to a plurality of computing devices, the server can easily couple to many computing devices to achieve task testing on an efficient scale.

Figure 2:
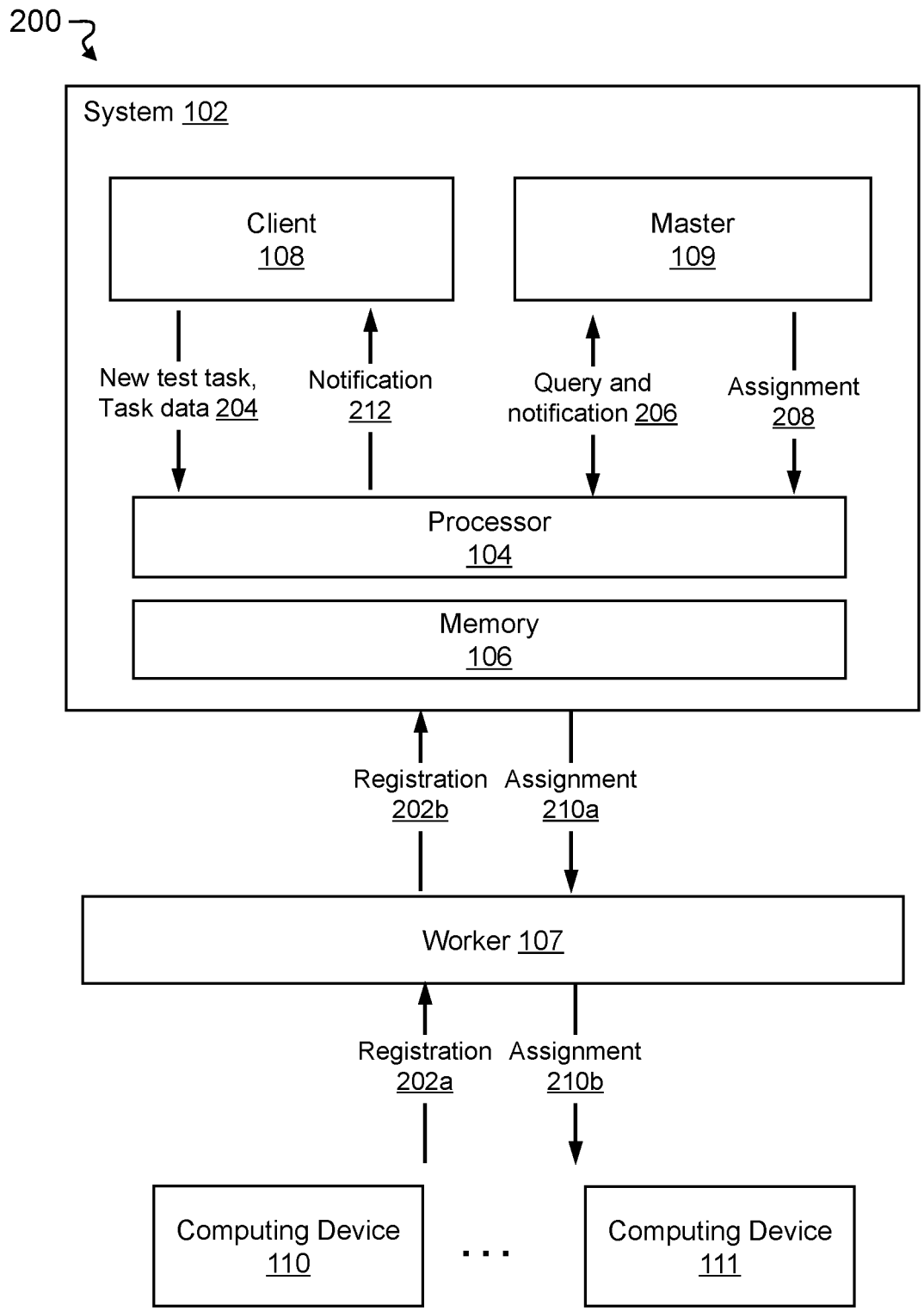
FIG. 2 illustrates an example system for task scheduling and device management, in accordance with various embodiments.

FIG. 2 illustrates an example system 200 for task scheduling and device management, in accordance with various embodiments. The operations shown in FIG. 2 and presented below are intended to be illustrative. In various embodiments, the system 200 may couple to a worker 107 and comprise a client 108 and a master 109. For simplicity, only one worker 107 is shown in this figure and following figures, but a person in the ordinary skill in the art would appreciate multiple worker devices similarly configured and function as the worker 107.

Figure 3A:
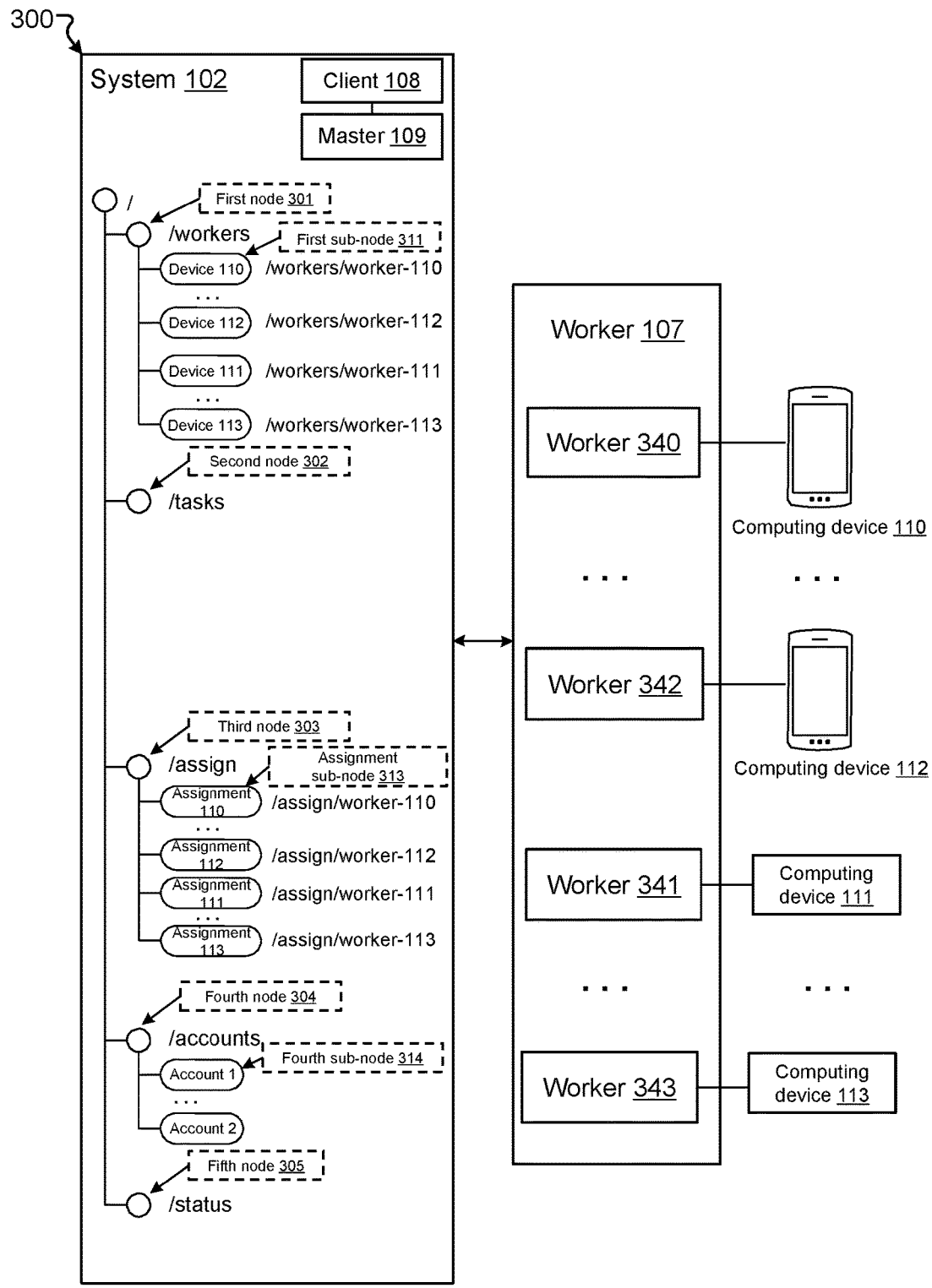
FIG. 3A illustrates an example system for task scheduling and device management, in accordance with various embodiments.
Figure 3B:
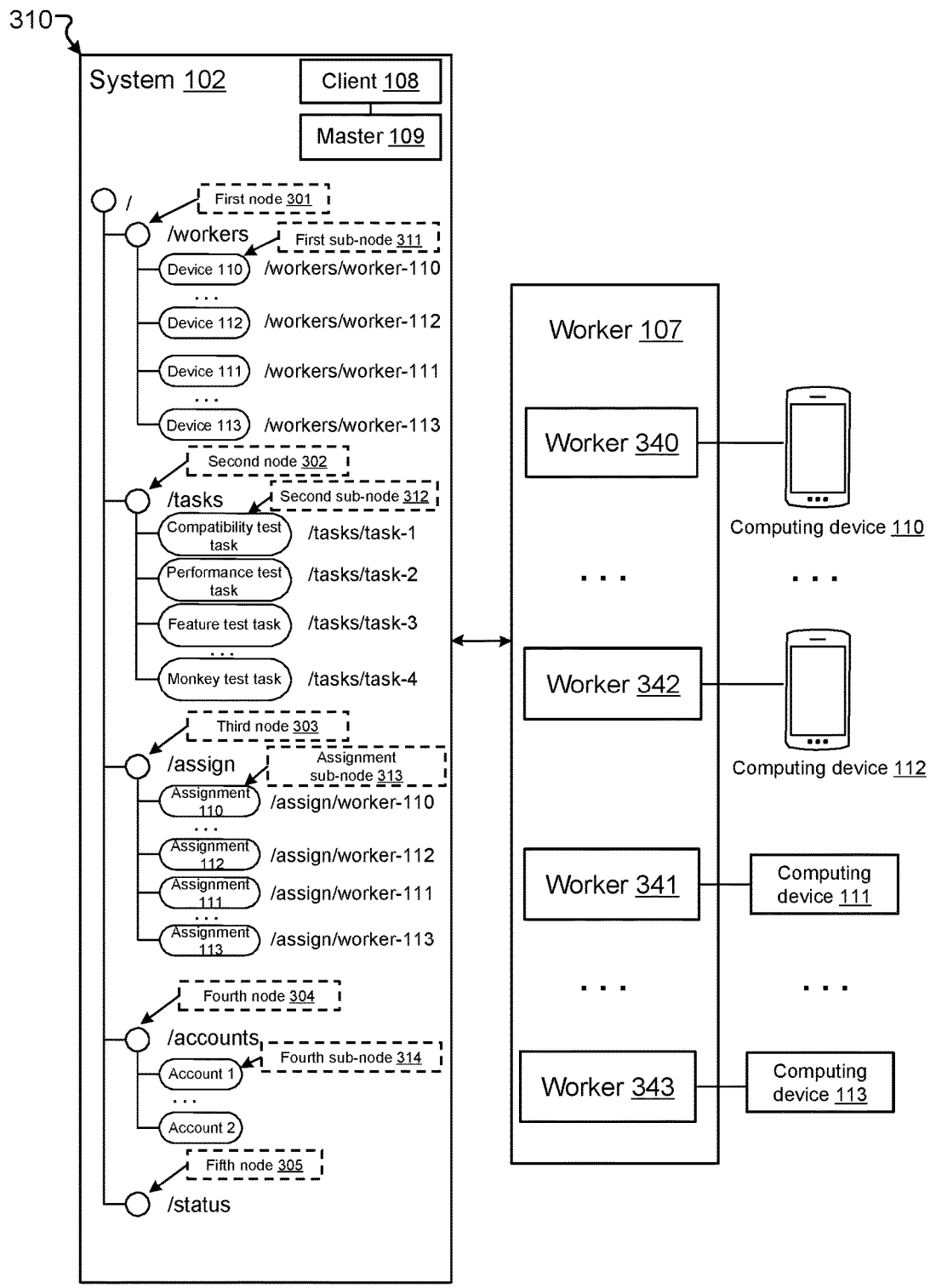
FIG. 3B illustrates an example system for task scheduling and device management, in accordance with various embodiments.
Figure 3C:
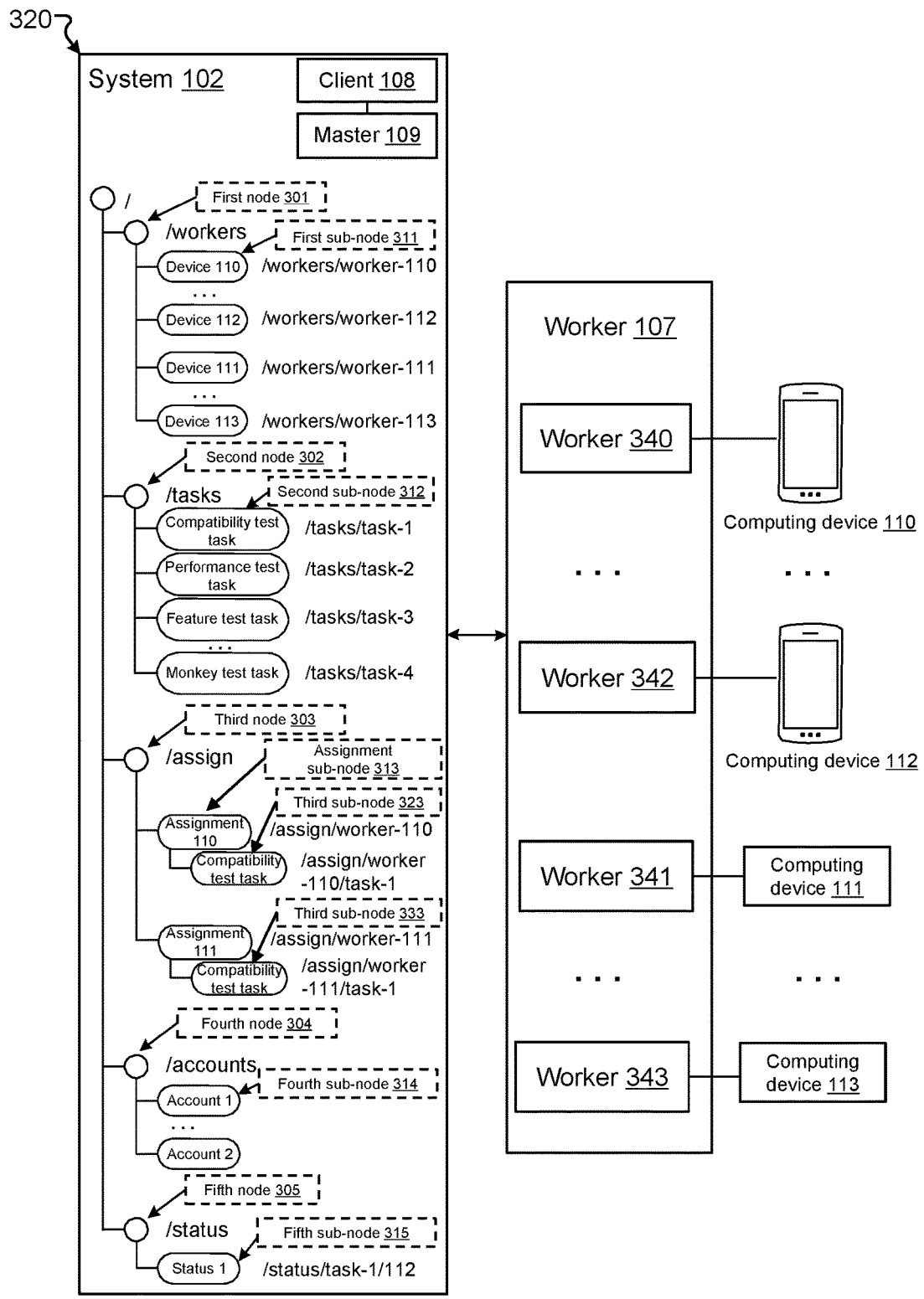
FIG. 3C illustrates an example system for task scheduling and device management, in accordance with various embodiments.

In various embodiments, the computing devices 110 and 111 may connect to the worker 107. Alternatively, computing devices 110 and 111 may connect to the system 102, if the worker 107 is a part of the system 102. The connection may comprise various forms via wire or wirelessly, such as a USB connection, a cable connection, a Bluetooth connection, a WIFI connection, a radio connection, etc. After the connection, the worker 107 may obtain device information of the one or more computing devices, register the one or more computing devices under the system 102 (e.g., under a first node of the system 102 described below), and indicate statuses of the one or more computing devices to the system 102. For example, the computing devices 110 and 111 may register with the worker 107 via registration 202a, and the worker 107 may relay the registration 202a as registration 202b to the system 102. From the registration or otherwise, the worker 107 may obtain device information and device status of the corresponding computing devices, which may also be relayed to the system 102. Further interactions among the system 200 are described below with references to FIGS. 3A-C. In FIGS. 3A-C, labels for nodes and sub-nodes are indicated in dash line frames.

Referring to FIG. 3A, FIG. 3A illustrates an example system 300 for task scheduling and device management, in accordance with various embodiments. The description of FIG. 3A is intended to be illustrative and may be modified in various ways according to the implementation. As shown in FIG. 3A, the system 102 is coupled to the worker 107 and comprises the client 108 and the master 109. A plurality of computing devices, including computing devices 110-113 are connected to the worker 107. The computing devices 110-113 may comprise cellphones, computers, tablets, wearable devices, etc. The computing device 110 may connect to worker module 340 of the worker 107, the computing device 112 may connect to worker module 342 of the worker 107, the computing device 111 may connect to worker module 341 of the worker 107, and the computing device 113 may connect to worker module 343 of the worker 107. The computing devices may be configured to perform various test tasks as described herein, and the various modules of the worker 107 may be configured to control the corresponding computing device, collect device information, monitor status, progress, and performance, etc.

In some embodiments, the system 102 may be accessible to a first node 301, a second node 302, a third node 303, a fourth node 304, and a fifth node 305. A person skilled in the art would appreciated that a path to the first node 301 may be /workers, a path to the second node 302 may be /tasks, a path to the third node 303 may be /assign, a path to the fourth node 304 may be /accounts, and a path to the fifth node 305 may be /status. The fourth and fifth nodes may be optional and supporting. The first node 301 may be coupled to one or more first sub-nodes (e.g., first sub-node 311) each for representing one of the computing devices and for storing the device information, device status, and task performance result from the corresponding computing device. The third node 303 may be coupled to one or more third sub-nodes (e.g., assignment sub-node 313) each for representing an assignment of the task to one of the computing devices. For example, after the computing device 110 connects to the worker 340, the worker 340 may obtain device information of the computing device 110 (e.g., directly from the computing device 110, from Internet, from a memory, etc.) and transmit registration information (e.g., the device information of the computing device 110) to the system 102 to register the computing device 110. Upon successful registration, the system 102 may create a first sub-node 311 under the first node 301 to represent the computing device 110. A person skilled in the art would appreciate that a path to the first sub-node 311 (device 110) may be /workers/worker-110.

Further, the system 102 may create a corresponding assignment sub-node 313 under the third node 303. A person skilled in the art would appreciate that a path to the assignment sub-node 313 may be /assign/worker-110. With the creation of the assignment sub-node 313, the computing device 110 can monitor any information (e.g., a sub-node) added under the assignment sub-node 313 to detect any assignment of test task to the computing device 110. Other computing devices may be registered similarly with the system 102 to create the corresponding sub-nodes and assignment sub-nodes. As such, a plurality of computing devices can be individually coupled to the system 102, properly registered, and initialized to receive any test task assignment.

Further, the fourth node 304 may be coupled to one or more fourth sub-nodes (e.g., fourth sub-node 314) each for representing a test account. Each account (e.g., account 1) may be used by one or more computing devices to perform a test task. In some embodiments, an account is required to perform a test task on a computing device. The other nodes are described below with reference to FIGS. 3B-C.

Referring back to FIG. 2, to test an application (APP) by executing at least a part of a test script on various computing devices, the client 108 may obtain task data associated with a task and register the task under the system 102 (e.g., under a second node of the system 102 described below). For example, the client 108 may receive or generate a task (e.g., a new test task 204) and submit the new test task 204 to the processor 104. The new test task 204 may comprise corresponding task data. The task data may comprise type of the new test task (e.g., compatibility test task, performance test task, feature test task, Monkey test task, etc.), information of one or more computing devices to run the new test task (e.g., some specific brands of cellphones to run the new test task, a serial number of a computing device for running the new test task, etc.), an account assignment requirement associated with the new test task (e.g., whether account assignment is needed for performing the new test task), information of an APP to be tested (e.g., a URL of the APP stored in the memory 106 or otherwise accessible to the system 102), and information of a test script for running the new test task (e.g., a git address to a test script stored in the memory 106 or otherwise accessible to the system 102). The client 108 may implement various methods, such as a RESTful (representational state transfer) API, to allow users and/or devices to communicate with the system 102 (e.g., via Internet), submit test tasks, check test results or device status, etc. Accordingly, the system 102 may obtain the task data associated with the new test task. If the new test task is completed, the processor 104 may notify the client 108 via notification 212. The system 102 may transmit a result of the test task performance and the device status to the client 108.

Referring to FIG. 3B, FIG. 3B illustrates an example system 310 for task scheduling and device management, in accordance with various embodiments. The description of FIG. 3B is intended to be illustrative and may be modified in various ways according to the implementation. The system 310 is similar to the system 300 described above, except for the second node 302. The second node 302 may be coupled to one or more second sub-nodes (e.g., second sub-node 312) each for storing a test task. For example, the client 108 may submit a compatibility test. The system 102 may create a second sub-node 312 to represent the compatibility test. A person skilled in the art would appreciated that a path to the second sub-node 312 (compatibility test) may be /task/task-1. The task data associated with the new test task can be written to the corresponding second sub-node, such that the task data can be retrieved for facilitating performance of the test task at the computing device(s). Similarly, the client 108 may submit a performance test task, a feature test task, and a Monkey test task, and the system 102 may create corresponding second sub-nodes as shown in FIG. 3B.

Referring back to FIG. 2, the master 109 may instruct the processor 104 (e.g., via query and notification 206) to assign the new test task(s) to the computing device(s) (e.g., via assignment 208). Accordingly, the system 102 may transmit the assignment to worker 107 via assignment 210a, and the worker 107 may relay the assignment 210a to the computing device(s) as assignment 210b. The system 102 may also notify the master 109 (e.g., via query and notification 206) about the task assignment.

Referring to FIG. 3C, FIG. 3C illustrates an example system 320 for task scheduling and device management, in accordance with various embodiments. The description of FIG. 3C is intended to be illustrative and may be modified in various ways according to the implementation. The system 320 is similar to the system 310 described above, except for the third node 303 and the fifth node 305.

In some embodiments, the master module may assign under the system 102 (e.g., under a third node of the system 102 described below) the task to one or more of the registered computing devices based at least on the obtained device information, the obtained task data, and the computing device statuses. To assign under the third node the task to one or more of the registered computing devices based at least on the obtained device information, the obtained task data, and the computing device statuses, the master module may determine one or more of the registered computing devices based at least on the obtained device information, the obtained task data, and the computing device statuses and assign under the third node the task to the one or more determined computing devices.

In some embodiments, the master 109 may monitor the second node 302. Upon detecting a new second sub-node (e.g., second sub-node 312 for representing a new compatibility test task) under the second code 302, the master 109 may obtain task data under the second sub-node. For example, the master 109 may obtain the task data of the compatibility test task from the second sub-node 312.

In some embodiments, the master 109 may assign a new test task to one or more computing devices. To this end, the master 109 may monitor the first node 301 for any available computing device. For example, the master 109 may detect that the first sub-nodes corresponding to computing devices 110 and 111 are idle and determine to use the computing devices 110 and 111 to perform the new test task, provided that these computing devices also fulfill other requirements in the task data (e.g., matching device type). Accordingly, the system 102 may set the status of the computing devices 110 and 111 to busy, such that these two computing devices will not be assigned to perform other tasks until they finish the new test task and their status being reset to idle. Continuing the example, the master 109 may also detect that the first sub-node corresponding to the computing device 112 is not idle (e.g., in a busy state) and determine not to use computing device 112 for performing the new test task. Accordingly, as shown in FIG. 3C, the system 102 may create a fifth sub-node 315 under the fifth node 305. The fifth node 305 may be coupled to one or more fifth sub-nodes (e.g., fifth sub-node 315) each for representing a status. The system 102 may set the fifth sub-node 315 (status 1) to error to indicate that the compatibility test task (task-1) cannot be performed by computing device 112. A person skilled in the art would understand the a path to the fifth sub-node 315 may be /status/task 1/112.

In some embodiments, the master 109 may further monitor the fourth node 304. In response to detecting an available fourth sub-node, the system 102 may set the fourth sub-node to busy and associate the fourth sub-node with the first sub-node(s) or computing device(s) to perform the new test task. For example, the master 109 may detect that the fourth sub-node 314 (account 1) is available, and the system 102 may associate the fourth sub-node 314 with the computing device 110 and/or computing device 111 to perform the compatibility test task (task-1). If no account is available and if an account is required to perform a new test task, the system 109 may create a fifth sub-node under the fifth node (not shown in FIG. 3C) as described above to indicate that the test task cannot be performed by the computing device(s).

In some embodiments, the master 109 (or the system 102) may establish mapping between one or more first sub-nodes and a test script for running the new test task. For example, if the task data comprises a serial number of a computing device for running the new test task, the system 102 may scan the first sub-nodes for any computing device with a matching serial number. Once a matching serial number is found, the mapping can be established between the first sub-node (associated with the computing device) and the test script, such that when the test script is executed, at least a part of a test APP can be executed on the computing device corresponding to the first sub-node. If no account is available and if an account is required to perform a new test task, the system 109 may create a fifth sub-node under the fifth node (not shown in FIG. 3C) as described above to indicate that the test task cannot be performed by the computing device(s).

In some embodiments, if the mapping is successful, the master 109 (or the system 102) may remove the new second sub-node and create one or more third sub-nodes to assign the new test task to the one or more first sub-nodes based on the obtained task data described above. The master 109 may also write data (e.g., an address of the test script, an address of the APP, information of the test account (e.g., account 1), etc.) to the one or more third sub-nodes. For example, the compatibility test task (task-1) is to be removed under the second node 302 (not shown in FIG. 3C). Since the compatibility task has been assigned, it can be removed from the second node 302 to prevent from being re-detected by other computing devices and re-preformed. The third node 303 may be coupled to one or more third sub-nodes each for representing an assignment of the test task to the computing device (e.g., the third node 303 couples to the assignment sub-node 313, which couples to the third sub-node 323). As shown in FIG. 3C, the compatibility test task (task-1) is assigned to computing devices 110 and 111 under the third node 303 via the third sub-nodes 323 and 333 respectively. A person skilled in the art would appreciated that a path to an assignment of the compatibility test to the computing device 110 may be /assign/worker-110/task-1, and a path to an assignment of the compatibility test to the computing device 111 may be /assign/worker-111/task-1.

In view of the above, the system 102 may create a new second sub-node comprising the task data of the new test task under the second node, and create one or more third sub-nodes to assign the new test task to one or more of the computing devices under the first node based on the obtained task data. Since the computing devices monitor their corresponding assignment sub-node, a new task assignment can be detected when added under the assignment sub-node. For example, the computing device 110 can detect the creation of the third sub-node 323 under the assignment sub-node 313. Accordingly, the computing device 110 may use an execution engine to execute at least a part of the test script to perform the compatibility test task for the test APP. After the task is completed, the system 102 may obtain the status of the computing device 110 via the first sub-node 311 and write the status under the fifth node 305. This status may be written to a fifth sub-node (not shown in FIG. 3C) as /assign/worker-110/task-1/110, to indicate the completion of the corresponding test task.

As such, various test tasks can be performed on various computing device by the coordination of the system 102 with or integrated with the worker 107, the client 108 and the master 109. Such system can provide a straightforward implementation for completing the testing with an efficient use of computing resources.

Figure 4A:
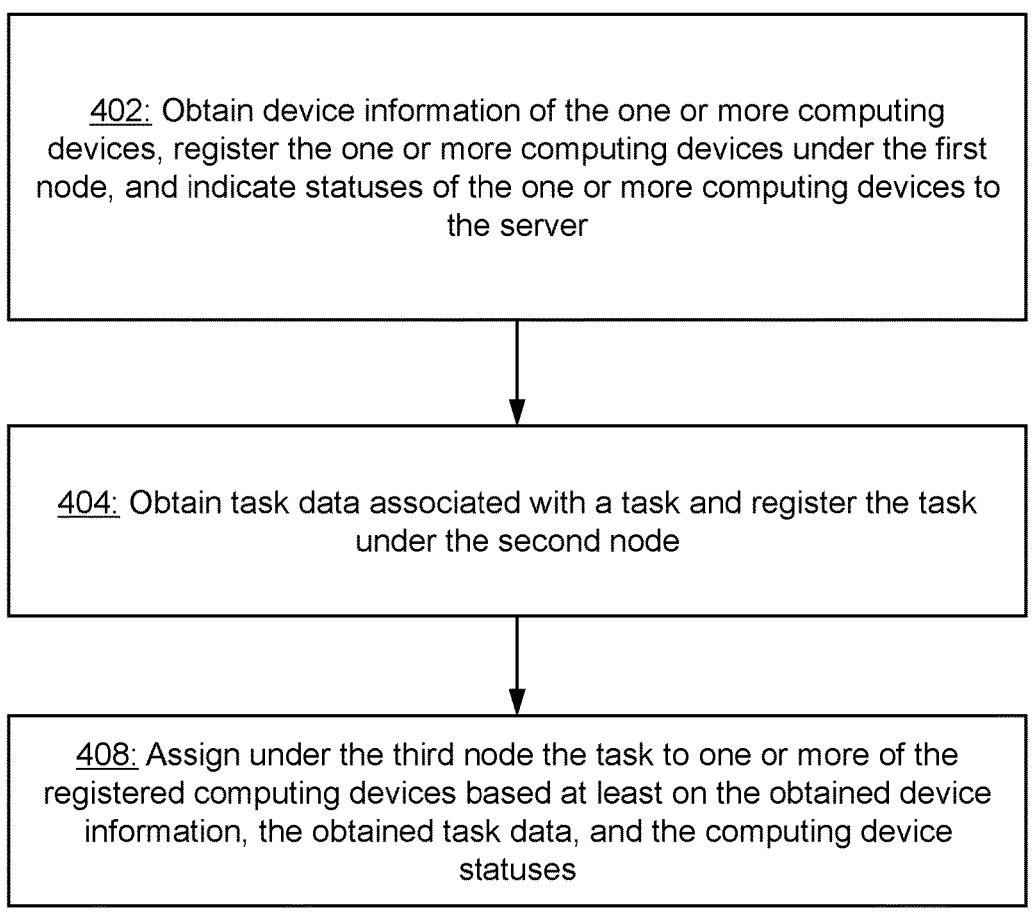
FIG. 4A illustrates a flowchart of an example method for task scheduling and device management, in accordance with various embodiments.

FIG. 4A illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices, such as a system comprising (1) a server comprising a client module, a master module, a first node, a second node, and a third node, and (2) one or more worker devices each coupled to the server and one or more computing devices.

At block 402, device information of the one or more computing devices is obtained, the one or more computing devices are registered under the first node, and statuses of the one or more computing devices are indicated to the server. The one or more worker devices may implemented this step. At block 404, task data associated with a task is obtained and the task is registered under the second node. The client module may implement this step. At block 406, the task is assign under the third node to one or more of the registered computing devices based at least on the obtained device information, the obtained task data, and the computing device statuses. The master module may implement this step.

Figure 4B:
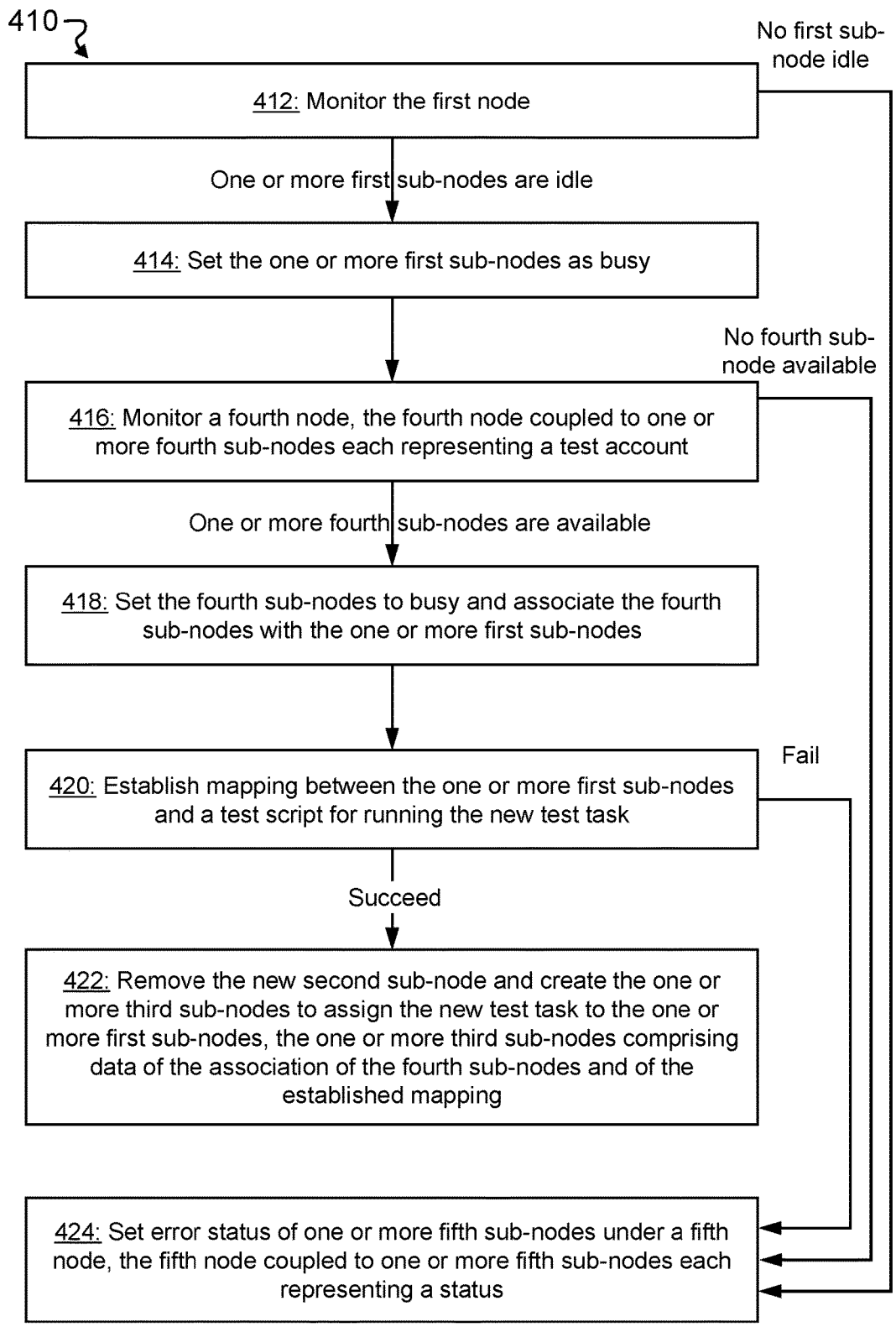
FIG. 4B illustrates a flowchart of another example method for task scheduling and device management, in accordance with various embodiments.

FIG. 4B illustrates a flowchart of an example method 410, according to various embodiments of the present disclosure. The block 406 described in FIG. 4A may comprise the method 410. The method 410 may be implemented in various environments including, for example, the environment 100 of FIG. 1. The operations of method 410 presented below are intended to be illustrative. Depending on the implementation, the example method 410 may include additional, fewer, or alternative steps performed in various orders or in parallel. The example method 410 may be implemented in various computing systems or devices including one or more processors of one or more servers.

At block 412, the first node is monitored. At block 414, in response to detecting one or more idle first sub-nodes, set the one or more first sub-nodes as busy, as discussed above. At block 416, a fourth node is monitored, the fourth node coupled to one or more fourth sub-node each representing a test account. At block 418, in response to detecting one or more available fourth sub-nodes, the fourth sub-nodes are set to busy and associated with the one or more first sub-nodes. At block 420, mapping between the one or more first sub-nodes and a test script for running the new test task is established. At block 422, if the mapping is successful, the new second sub-node is removed, and the one or more third sub-nodes is created to assign the new test task to the one or more first sub-nodes, the one or more third sub-nodes comprising data of the association of the fourth sub-nodes and of the established mapping. If no first sub-node is idle at block 412, no fourth sub-node is available at block 416, or the mapping is unsuccessful, the method may proceed to block 424. At block 424, an error status may be set at one or more fifth sub-nodes under the fifth node, the fifth node coupled to one or more fifth sub-nodes each representing a status.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
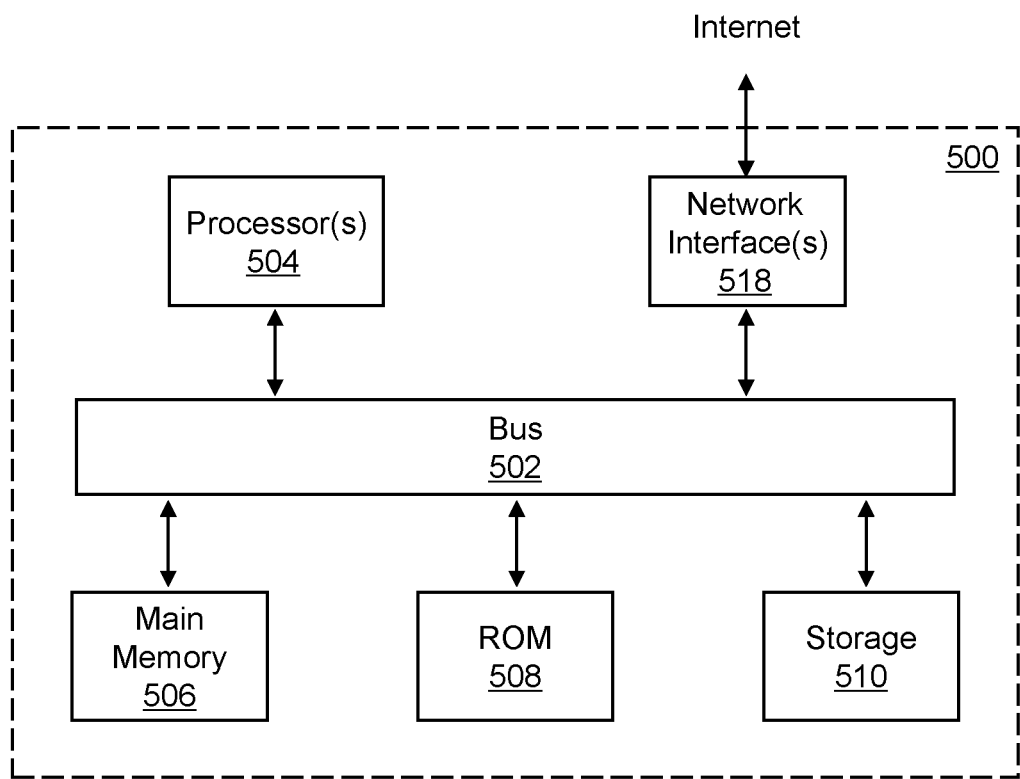
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

We claim:

1. A system, comprising:
a server comprising a client module, a master module, a first node, a second node, and a third node; and
one or more worker devices each coupled to the server and one or more computing devices, wherein:
the one or more worker devices are configured to obtain device information of the one or more computing devices, register the one or more computing devices under the first node, and indicate computing device statuses of the one or more computing devices to the server;
the client module is configured to obtain task data associated with a task and register the task under the second node, wherein the task data comprises a type of the task, information of one or more computing devices to run the task, an account assignment requirement associated with the task, information of an APP (application) to be tested, and an address of a test script for running the task; and
the master module is configured to assign under the third node the task to one or more of the registered computing devices based at least on the obtained device information, the obtained task data, and the computing device statuses.

2. The system of claim 1, wherein:
the task comprises at least one of a feature test task, a compatibility test task, a performance test task, or a Monkey test task.

3. The system of claim 1, wherein:
the one or more computing devices comprise a plurality of mobile devices of different operation environments; and
the operation environments comprise at least one of operation systems, device brands, or device models.

4. The system of claim 1, wherein:
the information of the APP comprises a URL (Uniform Resource Locator); and
the script address comprises a git address.

5. The system of claim 1, wherein to assign under the third node the task to one or more of the registered computing devices based at least on the obtained device information, the obtained task data, and the computing device statuses, the master module is configured to:
determine one or more of the registered computing devices based at least on the obtained device information, the obtained task data, and the computing device statuses; and
assign under the third node the task to the one or more determined computing devices.

6. The system of claim 1, wherein:
the first node is coupled to one or more first sub-nodes, each of the one or more first sub-nodes is configured to represent one of the computing devices and to store the device information, the device status, and task performance result from the corresponding computing device;
the second node is coupled to one or more second sub-nodes, each of the one or more second sub-nodes is configured to store a task; and
the third node is coupled to one or more third sub-nodes, each of the one or more third sub-nodes is configured to represent an assignment of the task to one of the computing devices.

7. The system of claim 6, wherein:
the server is accessible to a fourth node coupled to one or more fourth sub-nodes, each of the one or more fourth sub-nodes is configured to represent a test account; and
to assign under the third node the task to one or more of the registered computing devices based at least on the obtained device information, the obtained task data, and the computing device statuses, the master module is configured to:
monitor the first node;
in response to detecting one or more idle first sub-nodes, set the one or more first sub-nodes as busy;
monitor the fourth node;
in response to detecting one or more available fourth sub-nodes, set the one or more fourth sub-nodes as busy and associate the one or more fourth sub-nodes with the one or more first sub-nodes;
establish a mapping between the one or more first sub-nodes and a test script for running the task; and
remove the new second sub-node that is configured to store the task and create the one or more third sub-nodes to assign the task to the one or more first sub-nodes, the one or more third sub-nodes comprising data of the association of the fourth sub-nodes and of the established mapping.

8. The system of claim 7, wherein:
the server is further accessible to a fifth node coupled to one or more fifth sub-nodes, each of the one or more fifth sub-nodes is configured to represent a status; and
the master module is further configured to:
create a fifth sub-node under the fifth node; and
in response to finding no idle first sub-node, no available fourth sub-node, or the mapping unsuccessful, set the fifth sub-node as error.

9. A method for task scheduling and device management, implementable by a system comprising a first node, a second node, and a third node, the method comprising:
obtaining device information of one or more computing devices;
registering the one or more computing devices under the first node;
indicating computing device statuses of the one or more computing devices to the system;
obtaining task data associated with a task, wherein the task data comprises a type of the task, information of one or more computing devices to run the task, an account assignment requirement associated with the task, information of an APP (application) to be tested, and an address of a test script for running the task;
registering the task under the second node; and
assigning under the third node the task to one or more of the registered computing devices based at least on the obtained device information, the obtained task data, and the computing device statuses.

10. The method of claim 9, wherein:
the task comprises at least one of a feature test task, a compatibility test task, a performance test task, or a Monkey test task.

11. The method of claim 9, wherein:
the one or more computing devices comprise a plurality of mobile devices of different operation environments; and
the operation environments comprise at least one of operation systems, device brands, or device models.

12. The method of claim 9, wherein:
the information of the APP comprises a URL (Uniform Resource Locator); and
the script address comprises a git address.

13. The method of claim 9, wherein assigning under the third node the task to one or more of the registered computing devices based at least on the obtained device information, the obtained task data, and the computing device statuses comprises:
determining one or more of the registered computing devices based at least on the obtained device information, the obtained task data, and the computing device statuses; and
assigning under the third node the task to the one or more determined computing devices.

14. The method of claim 9, wherein:
the first node is coupled to one or more first sub-nodes, each of the one or more first sub-nodes is configured to represent one of the computing devices and to store the device information, the device status, and task performance result from the corresponding computing device;
the second node is coupled to one or more second sub-nodes, each of the one or more second sub-nodes is configured to store a task; and
the third node is coupled to one or more third sub-nodes, each of the one or more third sub-nodes is configured to represent an assignment of the task to one of the computing devices.

15. The method of claim 14, wherein:
the system further comprises a fourth node coupled to one or more fourth sub-nodes, each of the one or more fourth sub-nodes is configured to represent a test account; and
assigning under the third node the task to one or more of the registered computing devices based at least on the obtained device information, the obtained task data, and the computing device statuses comprises:
monitoring the first node;
in response to detecting one or more idle first sub-nodes, setting the one or more first sub-nodes as busy;
monitoring the fourth node;
in response to detecting one or more available fourth sub-nodes, setting the one or more fourth sub-nodes as busy and associating the one or more fourth sub-nodes with the one or more first sub-nodes;
establishing a mapping between the one or more first sub-nodes and a test script for running the task; and
removing the second sub-node that is configured to store the task and creating the one or more third sub-nodes to assign the task to the one or more first sub-nodes, the one or more third sub-nodes comprising data of the association of the fourth sub-nodes and of the established mapping.

16. The method of claim 15, wherein:
the system further comprises a fifth node coupled to one or more fifth sub-nodes, each of the one or more fifth sub-nodes is configured to represent a status; and
the method further comprises:
creating a fifth sub-node under the fifth node; and
in response to finding no idle first sub-node, no available fourth sub-node, or the mapping unsuccessful, setting the fifth sub-node as error.

17. A system, comprising:
one or more processors coupled to one or more computing devices and accessible to a first node, a second node, and a third node; and
a memory storing instructions that, when executed by the one or more processors, cause the system to:
obtain device information of one or more computing devices;
register the one or more computing devices under the first node;
indicate computing device statuses of the one or more computing devices to the system;
obtain task data associated with a task, wherein the task data comprises a type of the task, information of one or more computing devices to run the task, an account assignment requirement associated with the task, information of an APP (application) to be tested, and an address of a test script for running the task;
register the task under the second node; and
assign under the third node the task to one or more of the registered computing devices based at least on the obtained device information, the obtained task data, and the computing device statuses.

18. The system of claim 17, wherein:
the first node is coupled to one or more first sub-nodes, each of the one or more first sub-nodes is configured to represent one of the computing devices and to store the device information, the device status, and task performance result from the corresponding computing device;

the second node is coupled to one or more second sub-nodes, each of the one or more second sub-nodes is configured to store a task;

the third node is coupled to one or more third sub-nodes, each of the one or more third sub-nodes is configured to represent an assignment of the task to one of the computing devices;

the one or more processors are further accessible to a fourth node coupled to one or more fourth sub-nodes, each of the one or more fourth sub-nodes is configured to represent a test account; and to assign under the third node the task to one or more of the registered computing devices based at least on the obtained device information, the obtained task data, and the computing device statuses, the system is caused to:

monitor the first node;

in response to detecting one or more idle first sub-nodes, set the one or more first sub-nodes as busy;

monitor the fourth node;

in response to detecting one or more available fourth sub-nodes, set the one or more fourth sub-nodes as busy and associate the one or more fourth sub-nodes with the one or more first sub-nodes;

establish a mapping between the one or more first sub-nodes and a test script for running the task; and remove the second sub-node that is configured to store the task and create the one or more third sub-nodes to assign the task to the one or more first sub-nodes, the one or more third sub-nodes comprising data of the association of the fourth sub-nodes and of the established mapping.

* * * * *